Dec. 23, 1969         MINORU TAKAHASHI ET AL         3,485,156
              RETURNING MEANS FOR THE REWINDING BUTTON IN A CAMERA
Filed Oct. 27, 1966                                  3 Sheets-Sheet 1

FIG. 3
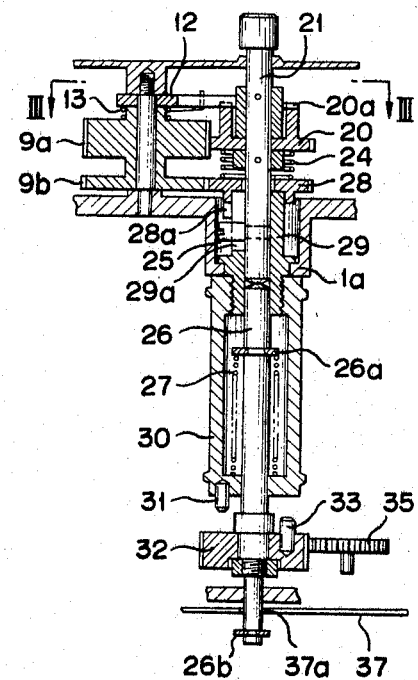
FIG. 4
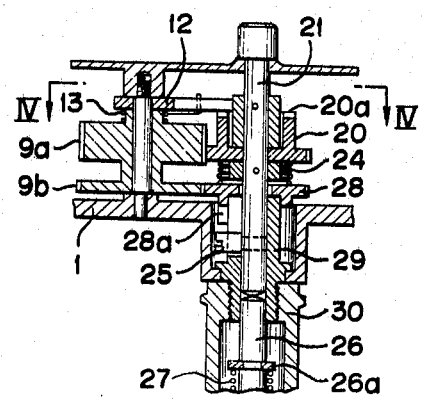
FIG. 5
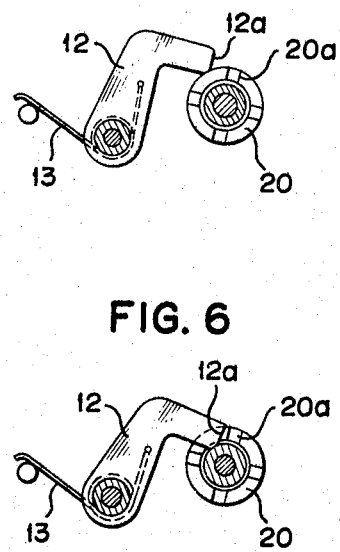
FIG. 6
FIG. 7
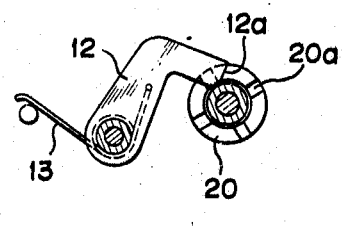

United States Patent Office 3,485,156
Patented Dec. 23, 1969

3,485,156
RETURNING MEANS FOR THE REWINDING BUTTON IN A CAMERA
Minoru Takahashi, Yokohama-shi, and Yukio Ishiwata, Tokyo, Japan, assignors to Nippon Kogaku K.K., Tokyo, Japan, a corporation of Japan
Filed Oct. 27, 1966, Ser. No. 590,015
Int. Cl. G03b 19/04
U.S. Cl. 95—31     2 Claims

ABSTRACT OF THE DISCLOSURE

A structure in a camera for rewinding the film in which a clutch member is slidably moved by the manual operation of a push button so as to disconnect the winding mechanism from a sprocket wheel to permit the film rewinding operation to take place. Thereafter, by the rotation of a winding lever or by the driving of a winding motor, the clutch member is automatically restored to its initial position to again connect the winding mechanism to the sprocket wheel to permit the film winding operation to take place.

---

This invention relates to film rewinding means and in particular to returning means for the film rewinding button of cameras.

The rewinding operation of the film in cameras is generally carried out by freely rotating a sprocket wheel by means of the rewinding button. During the rewinding operation the button is prevented from being returned to the original position. After the completion of the rewinding operation the button is returned to the original position. In conventional devices the winding lever and the button returning mechanism are operated as a unit. For the connecting means to the winding mechanism of the winding lever, a one way transmission system is generally employed using a ratchet or a binding spring, and therefore there is no problem at all when used in conventional cameras. However, in the case of a camera that is either manually wound by means of a winding lever or is wound by means of a selective motor drive means, or in particular, in such a case wherein the winding by the motor drive means is directly made from the lower side of the spool shaft through a coupling, the above mentioned one way transmission system becomes a hindrance, and the operation thereof is not transmitted to the button returning mechanism. This is a drawback that makes it difficult to carry out the return of the rewinding button to the original position.

It is therefore the object of the present invention to provide a returning means for the film rewinding button, by which it is possible to carry out the returning of the rewinding button either by means of the winding lever or by the motor drive means.

In accordance with the present invention there is provided a structure for returning the film rewinding button to its original position permitting the winding of the film. The structure comprises a film rewinding button shaft, which rotates in unison with a film rewinding sprocket. The button shaft is rotatable and axially movable relative to the camera body. A biasing member normally urges the button shaft to project out from the camera body. A return gear is provided having a plurality of axially extending projections provided in a predetermined angularly spaced relationship on one end surface and radially extending teeth on the peripheral portion thereof. An intermediate gear in mesh with a film winding gear for a manual winding lever and a spool gear of a film winding spool provided in the camera body. The return gear is secured to the button shaft and is rotatably and movably in unison with the button shaft in its axial direction, the intermediate gear being in mesh with the peripheral teeth of the return gear in such a manner that the engagement of both gears is maintained when the return gear moves in axial direction. A rotatable stop lever is provided on the camera body in a plane perpendicular to the button shaft, the front end portion of the stop lever being smaller than the predetermined space between adjacent projections on the return gear. Biasing means urge said front end portion of the stop lever into contact with the periphery of the return gear so that when the button shaft moves downward in the axial direction the front end portion of the stop lever rotates to a position above said one end surface of the return gear to prevent the return gear from returning to its original upper position and, when the return gear is further ortated said front end is rotated in the opposite direction against the biasing means with the aid of said projection to release and permit the button shaft to return to its original position.

The object and the advantages of the present invention will be more clearly understood from the following description referring to the embodiments shown in the attached drawing in which:

FIG. 3 and FIG. 4 are cross sectional elevational views of the structure shown in FIG. 1 showing the operations of the above mentioned embodiment of the present invention;

FIG. 5 is a plan view taken along the line II—II of FIG. 2;

FIG. 6 is a plan view taken along the line III—III of FIG. 3;

FIG. 7 is a plan view taken along the line IV—IV of FIG. 4;

Figure 1:
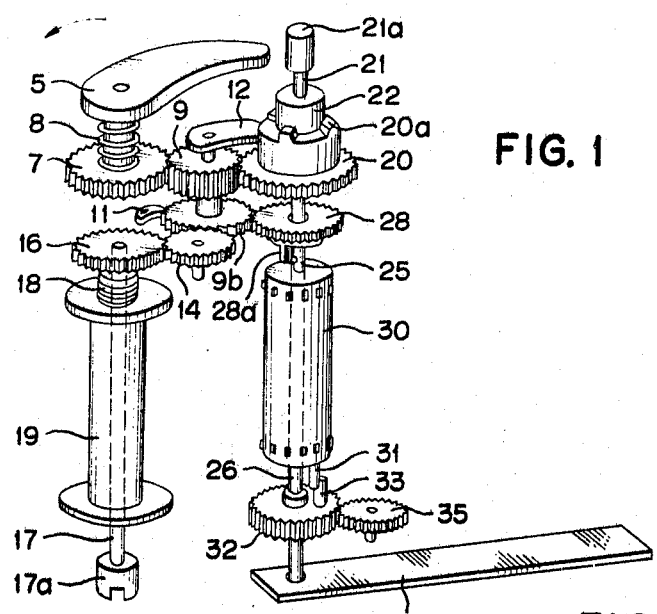
FIG. 1 is a perspective view of an embodiment of the present invention.
Figure 2:
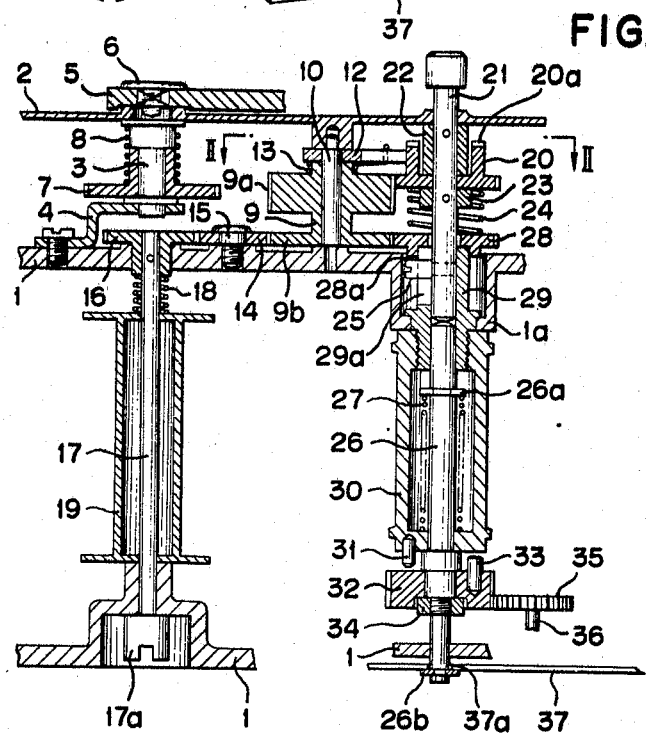
FIG. 2 is a developed cross sectional elevational view thereof.
Figure 8:
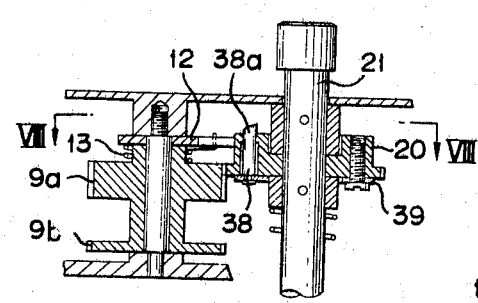
FIG. 8 is a fragmentary cross sectional elevational view of another embodiment of the present invention.

In the drawing, 1 is a camera body, 2 is an upper lid, 3 is a lever shaft that is rotatably supported by a bearing member 4 provided on the body 1, and 5 is a winding lever fixed on the upper end of the lever shaft 3 by a screw 6 so as to rotate together with the lever shaft 3. Element 7 is a winding gear rotatably mounted on the lever shaft 3 and is connected to the shaft 3 by means of a binding spring 8. The binding spring 8 transmits the rotation of the shaft 3 to the winding gear 7 when the lever shaft 3 is rotated in the counter clockwise direction, and when the lever shaft 3 is rotated in the opposite, i.e. clockwise, direction, the spring 8 is loosened, and does not transmit the rotation of the lever shaft 3 to the gear 7. Element 9 is an intermediate gear having two toothed portions 9a and 9b, and is supported rotatably by an intermediate shaft 10. The gear 9 is so mounted that it can be freely rotated in the clockwise direction, but the counter clockwise rotation thereof is controlled by means of a ratchet 11. Element 12 is a stop lever and is supported rotatably by means of said intermediate shaft 10, and it is urged by a biasing member, for example, spring 13 so as to rotate in the clockwise direction. The stop lever 12 is, at certain times, in contact with the peripheral side of a return-gear 20, which is described hereinafter. Element 14 is an idler gear, and is supported rotatably by means of a shaft 15, and 16 is a spool gear which is rotated as a unit together with a spool shaft 17, and transmits rotation to a spool 19 by means of the friction spring 18. The lower end of the spool shaft 17 is formed with a coupling 17a so that it may be connected to the winding mechanism (not shown) of the conventional motor drive means. 20 is a return gear having a plurality of projections 20a. In this embodiment four axially extending and angularly spaced projections 20a are provided on the upper surface of the return gear 20 which is mounted rotatably onto the rewinding button shaft 21, the movement thereof in the axial direction is controlled or restricted by collars 22 and 23 fixed on the button shaft 21. The rewinding button shaft 21 is supported rotatably and movably by means of the upper lid 2 and a rotatable bearing 29, which is described hereinafter, and always urged upwards by means of a spring 24. Element 25 is a clutch-pin provided on the button shaft 21, and 26 is a coupling shaft supported rotatably and movably by the body 1 and the rotatable bearing 29. On the central portion of the coupling shaft 26 a flange 26a is provided whereby the coupling shaft is urged upwards by a spring 27 so as to have the coupling shaft 26 in contact with the rewinding button shaft 21. Element 28 is a clutch gear rotatably supported by the rotatable bearing 29, and is coupled to the clutch pin 25 by a clutch piece 28a provided on the lower portion thereof. The rotatable bearing 29 is mounted to rotate along with a sprocket 30, and is connected to the clutch-pin 25 by a straight line groove 29a provided on the upper cylindrical surface, and is rotatably mounted on a bearing portion 1a provided on the body 1. Element 31 is a connecting pin provided on the lower end of the sprocket 30, and 32 is a connecting gear supported rotatably by the rewinding button shaft 21. The gear 32 is connected to the sprocket 30 through a pin 33 provided on the upper surface thereof and the connecting pin 31. Element 34 is a ring that limits the movement of the connecting gear 32 in the axial direction, and 35 is a transmission gear that is supported rotatably by a shaft 36, and is connected to the conventional shutter mechanism and the winding control mechanism (both being not shown) provided within the body 1. Element 37 is lever coupled to the shutter release (not shown) by the conventional method, and is connected to retainer 26b on the coupling shaft 26 by an engagement hole 37a. By means of the operation of the shutter release (not shown), the coupling shaft 26 is pushed downwards to cut off the connection of the pins 31 and 33.

The device of the present invention has the above mentioned structure, and therefore when the winding lever 5 is rotated in the counter clockwise direction, the winding gear 7 is rotated in the same direction by means of the binding spring 8, and rotates the clutch gear 28 in the counter clockwise direction through the intermediate gear 9, and at the same time, it rotates the spool gear 16 in the clockwise direction through the idler gear 14. Therefore, the rotation of the spool gear 16 rotates the spool 19 in the same direction through the friction spring 18 to wind up the film. Rotation of the clutch gear 28 rotates the rewinding button-shaft 21 in the counter clockwise direction by means of the clutch piece 28a and the clutch-pin 25, and further by means of the straight line groove 29a, the rotatable bearing 29 and the sprocket 30 also being rotated in the counter clockwise direction to send the film to the spool. At the same time, the connecting gear 32 is rotated by means of the pins 31 and 33 in the counter clockwise direction to cock the shutter (not shown), and the winding control mechanism (not shown) is operated to be controlled at the predetermined winding degree. Then the winding lever 5 is returned to the original position at the completion of the winding, but in this case, the ratchet 11 controls the movement of the intermediate gear 9 in the opposite direction, and besides, the binding spring 8 is loosened with the result that the lever 5 alone is returned to the original position, and the remaining portions retain the wound up state making it possible to release the shutter. On the other hand, when the motor drive means (not shown) is used, the spool shaft 17 is rotated in the clockwise direction by the coupling 17a to wind up the film. In regard to the winding process, it is the same process as when the winding lever 5 is employed, but said lever 5 is retained in the original position by means of the operation of the binding spring 8.

When the rewinding of the film is carried out, the rewinding button 21 is pushed down with the tip of a finger, and the coupling shaft 26 is lowered to release the two sets of connections, i.e., the connection between the clutch pin 25 and the clutch piece 28a, and the connection between the connection pin 31 and the pin 33 of the connecting gear 32 as is shown in FIG. 3, and therefore the sprocket 30 is released of the control of the shutter mechanism and the winding mechanism, and can be rotated freely, in either case when it is operated by hand or driven by motor, the rewinding operation of the film is carried out. At this time, the return gear 20 is also lowered, and therefore as is shown in FIG. 3 and FIG. 6 the end of the stop lever 12 is rotated above the upper surface of the return gear 20 to prevent the returning thereof to the original position. Therefore, even if the tip of a finger is removed from the rewinding button, the said rewinding button 21 can stay in the lower position.

Figure 10:
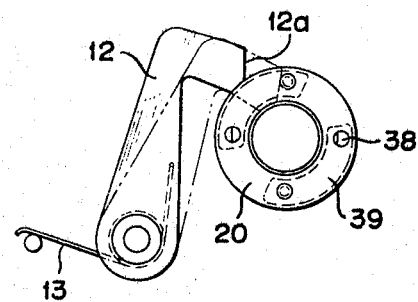
FIG. 10 is a plan view taken along the line VIII—VIII of FIG. 8.
Figure 9:
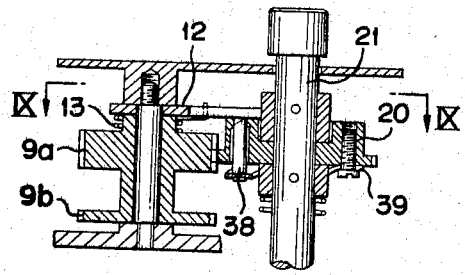
FIG. 9 is a cross sectional elevational view showing another step in the operation of the embodiment of FIG. 8.
Figure 11:
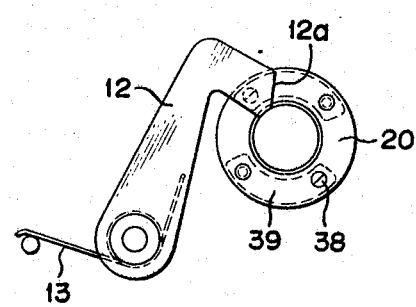
FIG. 11 is a plan view taken along the line IX—IX of FIG. 9.

After the completion of the rewinding operation of the film, upper teeth portion 9a of the intermediate gear 9 rotates the return gear 20 in the counter clockwise direction when the winding lever 5 or, in the case of motor drive, the coupling 17a is rotated as in the case of winding of the film, and therefore projection 20a pushes the end surface 12a of the stop lever 12 to rotate the stop lever 12 in the counter clockwise direction against the force of the spring 13, and the locking state as mentioned above is removed. Therefore, the rewinding button-shaft 21 and the coupling-shaft 26 are returned to the original position, by means of the spring 27, to permit the next film winding operation. If the end of the stop lever 12 is exactly on the position of a projection 20a of the return gear 20 as shown in FIGS. 3 and 6, the rewinding button shaft 21 is more lowered, and as is shown in FIG. 4 and FIG. 7, the end of the stop lever 12 is rotated above the projection 20a, and as mentioned above, when the return gear 20 is rotated, the projection 20a is released from the stop lever 12, and therefore it takes the position shown in FIG. 3. Thereafter in accordance with the above mentioned process, the rewinding button shaft 21 and the coupling shaft 26 are returned to the original positions. FIG. 8 through FIG. 11 are the views showing another embodiment of this invention wherein the projections are movable. 38 is the movable projection provided on the return gear 20, and it is so mounted that it can be moved in the up and down direction. One end of the projection is secured to arcuate spring 39, and the other end thereof is made to form the sliding surface 38a, which slides outwardly. When the rewinding button 21 is pushed down, the end of the stop lever 12 is rotated above the return gear 20 as is shown by the dot and dash lines in FIG. 10 to prevent the return thereof. In case the end of the stop lever 12 is at the position of the projection 38, the end of the said lever 12 pushes the sliding surface 38a of the projection 38 by the force of the spring 13 to lower the said projection 38 against the force of the arcuate spring 39 as is shown in FIG. 9 through FIG. 11. In regard to the returning process of the rewinding button shaft 21 and the coupling shaft 26 to the original positions it is the same as in the case of the first embodiment and therefore the explanation thereabout is omitted here. The rewinding button shaft 21 is rotated along with the sprocket 30, and therefore it is possible to carry out the rewinding by one frame at a time when double exposure is carried out by providing the indicator point 21a on the upper surface of the said button shaft 21.

As mentioned above, in accordance with the present invention, it is not only possible to easily carry out the return operation of the rewinding button shaft and the joint shaft either by means of the winding lever or the spool shaft, but at the same time in so far as the structure is concerned, the return gear is made smaller in accordance with this invention, and at the same time the necessary rotation range of the stop lever can be made smaller, and the required space as a whole can be decreased. This is an advantage of this invention, and besides according to this invention, the return gear and the rewinding button shaft are separated, and therefore as shown in the embodiments, when the indicator point is provided on the upper surface of the said button shaft, it is possible to rewind the film by one frame at the time when the double exposure is carried out. In addition to that, it is possible to quicken the rotation of the return gear regardless of the said button shaft, and at the same time it is possible to provide a number of releasing ratchets, and therefore when compared with the conventional devices, the quick and accurate operation can be attained. Therefore, in accordance with the device of this invention there is almost no fear that mechanical troubles will develop. Again in accordance with the present invention, it is possible to employ the present invention for the conventional cameras having no motor drive means, and in this case the coupling of the spool shaft is not required.

What is claimed is:
1. A structure for rewinding the film in cameras, said structure comprising:
 (a) a sprocket for advancing the film;
 (b) a push button shaft for rewinding the film, said push button shaft being rotatable together with said sprocket and slidable in an axial direction;
 (c) a restoring gear having a plurality of angularly spaced apart projections extending axially from one end surface thereof and teeth extending radially from the periphery thereof, said restoring gear being rotatably mounted on said push button shaft and axially movable together therewith;
 (d) a spool for the film;
 (e) a spool gear secured to said spool;
 (f) an intermediate gear in meshing engagement with said restoring gear and said spool gear;
 (g) a film winding gear in meshing engagement with said intermediate gear;
 (h) a stop lever on the body of the camera, said stop lever being rotatable in a plane perpendicular to the longitudinal axis of said push button shaft, a free end of said stop lever being smaller than the space between adjacent ones of said projections on said restoring gear; and
 (i) means biasing the free end of said stop lever into contact with the periphery of said restoring gear so that when said restoring gear moves axially the free end of said stop lever cooperates with said projections on said restoring gear to prevent the return of said push button shaft to its position before moving and when said restoring gear rotates, the free end of said stop lever is released from engagement with said projections.

2. A structure for returning the film rewinding button to its original position for enabling the winding of the film according to claim 1, in which the plurality of projections are movable along the axis of the button shaft and a bias means is provided to normally urge the projections in the upward direction.

References Cited

UNITED STATES PATENTS

| 2,150,696 | 3/1939 | Nelson | 242—71.6 |
| 2,791,163 | 5/1957 | Bammesberger et al. | 242—71.6 XR |
| 3,014,673 | 12/1961 | Lange | 242—71.6 |
| 2,717,055 | 9/1955 | Heiniger | 352—173 |

NORTON ANSHER, Primary Examiner

JOSEPH F. PETERS, JR., Assistant Examiner

U.S. Cl. X.R.
242—71.6